July 20, 1965    W. J. PHYSIOC III    3,195,709
CONVEYOR AND ARTICLE TRANSFER DEVICE
Filed Sept. 28, 1962    2 Sheets-Sheet 1
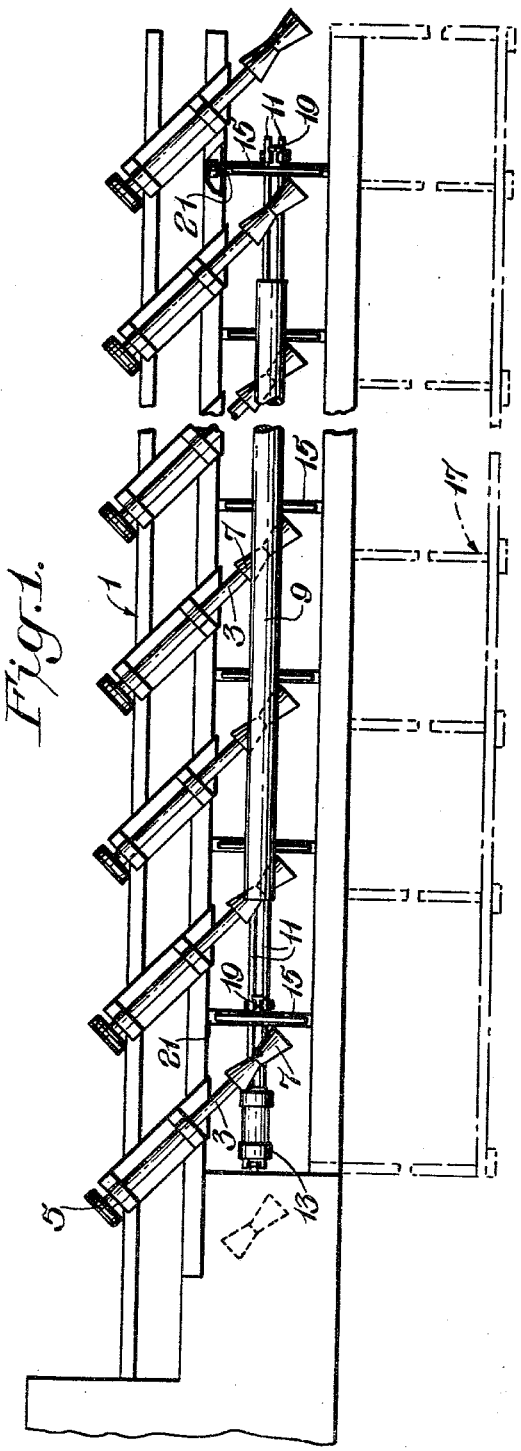
INVENTOR
Willis J. Physioc, III
BY Connolly and Hutz
ATTORNEYS July 20, 1965   W. J. PHYSIOC III   3,195,709
CONVEYOR AND ARTICLE TRANSFER DEVICE
Filed Sept. 28, 1962   2 Sheets-Sheet 2

INVENTOR
Willis J. Physioc, III
BY Connolly and Hutz
ATTORNEYS 3,195,709
CONVEYOR AND ARTICLE TRANSFER DEVICE
Willis J. Physioc III, Boonsboro, Md., assignor, by mesne assignments, to The Pangborn Corporation, Hagerstown, Md., a corporation of Delaware
Filed Sept. 28, 1962, Ser. No. 226,867
1 Claim. (Cl. 198—27)

The present invention relates to a conveyor and discharge assembly for conveying and discharging from the conveyor elongated articles, such as pipe, bars, billets, etc.

With prior conveyors and discharge assemblies, the articles are discharged from the conveyor by a mechanism operating at an angle thereto. This presents a problem in suitably recovering and realigning the article discharge mechanism for the next operation.

It is, therefore, one object of the present invention to provide a new and novel conveyor and discharge assembly wherein the elongated articles being conveyed are discharged by a mechanism operating in a path parallel to the conveyor travel.

Other objects and advantages will become more apparent from a study of the following description and drawing wherein:

FIGURE 1 is a top view of the conveyor and discharge assembly;

FIGURE 2 is a longitudinal section taken along lines 2-2 of FIGURE 3;

Figure 3:
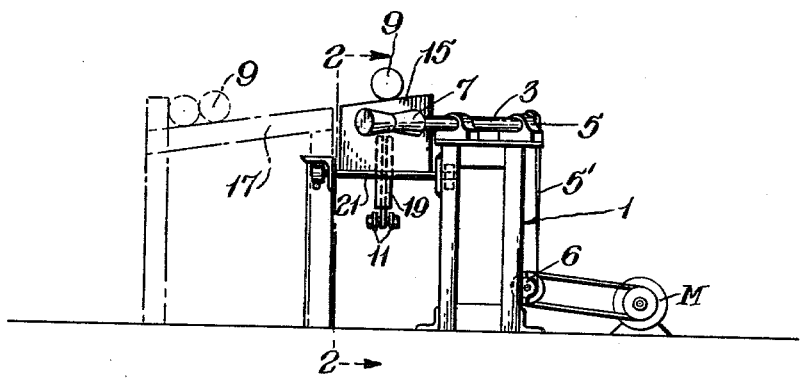
FIGURE 3 is an end view of the conveyor and discharge assembly of FIGURES 1 and 2 which also shows the work rack which receives the discharged articles from the conveyor.

As seen in FIGURES 1-3 of the drawing, an elongated support stand 1 supports a series of spaced-apart rotatable shafts 3 which are supported at an angle to the elongated support stand 1. As shown in FIGURE 3, these shafts are driven by pulleys 5 attached to one end of each of the shafts 5 which are connected by belts 5' to a common drive shaft 6 driven by motor M. The opposite end of the shafts extends outwardly beyond the stand support 1 and supports an article conveying roller 7 as shown in the drawing. The elongated article 9 rides in the middle narrowed portion of the roller 7 as shown in the drawing. Supported below the roller 7 is an elongated tie bar 11 which is reciprocated longitudinally of the conveyor by suitable means, such as the air or hydraulic cylinder 13 pivotally attached to the elongated conveyor support 1 shown in FIGURE 2.

Pivotally connected to the tie bar 11 at points spaced between the rollers 7 are plate members 15 which are alternately raised and lowered in an arc swing and in unison by the reciprocating action of the tie bar 11 into and out of the path of the elongated articles 9 traveling on the rollers 7. When in the raised position (FIGURE 2), the plates 15 in turn elevate or raise the articles 9 out of contact with the rollers 7. As better seen in FIGURE 3, the top edge of the plate 15 slants downwardly toward the outer edge of the conveyor (opposite the drive edge) whereby when the elongated articles 9 are raised by the plates 15 they roll down the slanted top edge of the plates and subsequently drop off into a collecting rack 17. With this arrangement, the elongated articles are discharged parallel to the conveyor whereby the articles are recovered in alignment for the next operation.

After the elongated article is discharged from the raised plates 15, the tie bar 11 is moved in the opposite direction by action of the cylinder 13 to lower the plates out of the path of the oncoming elongated article 9 advancing along the conveyor. When the elongated article (or articles) 9 has reached a suitable position, the plates are again swung upwardly to discharge the article 9 from the conveyor rollers 7 in the manner explained above.

Figure 4:
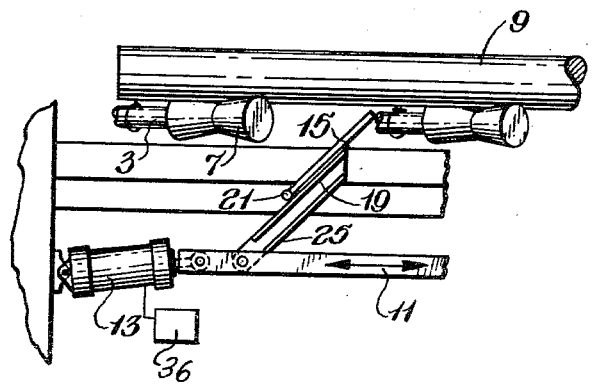
FIGURE 4 is a detail on an enlarged scale of a portion of the assembly of FIGURES 1 and 2 in one stage of operation.

To raise the plates 15, the cylinder 13 is actuated to extend the tie bar 11 which in turn urges the plate supports 19 to be moved in a direction away from the cylinder. Since the plate supports are pivoted at 21 to the conveyor stand 1 as shown in FIGURES 2-4, this action causes the plates to swing upwardly in an arc into verticle position to in turn raise the conveyed article 9. To lower the plates 15, the cylinder 13 is retracted whereby the plate supports 19 swing-return to their lowered position (see FIGURE 4). To accommodate the arc swing of plate 15 and its support 19, the cylinder 13 is pivotally mounted to the conveyor support 1. The cylinder will move up and down as required to accommodate the corresponding upward and downward movement of the tie bar 11 as dictated by the arc swing of the plate support 19.

In addition, the plate support 19 is H shaped to provide an extending edge 25 (FIGURE 4) which rests against the tie bar 11 when the support is in its lowered position to limit the downward swing of the plate 15.

The cylinder 13 can be controlled manually or controlled by a suitable automatic device having a timing device 36.

The above-described conveyor can be used with any apparatus which requires an elongated article discharge and has been found to be most satisfactory when used with abrasive blasting apparatus which cleans the articles. It can also be used as a conveying unit per se for merely transporting articles from one point to another.

As mentioned above, the primary advantage is that the articles are discharged from the conveyor by mechanism operating in line with the direction of work travel which mechanism then recoils away from the advancing articles being conveyed.

Obviously many modifications and variations of the present invention are possible in light of the above teachings. It is, therefore, to be understood that within the scope of the appended claim the invention may be practiced otherwise than as specifically described.

What is claimed is:

An article conveyor and discharge assembly for feeding successive articles comprising an elongated conveyor stand, a plurality of spaced-apart conveying means supported along the top of the conveyor stand, means supported below and between the article conveying means for raising the article being conveyed to a position above and out of the contact with the conveying means, said article raising means having a slanted top surface whereby the raised articles roll down said slanted surface, article collecting means positioned adjacent the conveyor for receiving the articles discharged from the article raising means, actuating means connected with the article raising means for raising and lowering the article raising means, said article raising means comprising an elongated tie bar, a plurality of plate members pivotally connected at spaced points to said tie bar and said conveyor stand, the top edge of each plate member tapering downwardly toward said article collecting means, said actuating means being connected to said tie bar, said actuating means raising said plate members in an arcuate path opposed to the direction of the article travel to raise the leading articles of successive articles above said conveying means, and lowering said plate members in the direction of the article travel to give the oncoming articles an extra push in their normal direction of travel to prevent jamming of said oncoming articles, and said actuating means including a pressure cylinder secured to one end of said tie bar and timing means connected to said pressure cylinder to regulate the raising and lowering of said plate members.

References Cited by the Examiner

UNITED STATES PATENTS

| 1,566,717 | 12/25 | Wolf | 198—219 |
|---|---|---|---|
| 2,210,531 | 8/40 | Engebaugh. | |
| 2,763,236 | 9/56 | Commings. | |
| 3,124,042 | 3/64 | Mahan | 91—37 |

FOREIGN PATENTS 638,312   3/62   Canada.

SAMUEL F. COLEMAN, *Primary Examiner.*

WILLIAM B. LA BORDE, *Examiner.*